INVENTOR.
FRANK I. ZONIS
BY Arthur L. Bowers
AGENT
Max L. Garner
ATTORNEY

ORTHOGONAL SEQUENCE GENERATOR

Filed June 19, 1964 4 Sheets-Sheet 2

INVENTOR.
FRANK I. ZONIS
BY Arthur L. Bowers
AGENT
Max L. Glaríner
ATTORNEY

INVENTOR.
FRANK I. ZONIS
BY Arthur L. Bowers
AGENT
Max L. Farmer
ATTORNEY

ORTHOGONAL SEQUENCE GENERATOR

Filed June 19, 1964 4 Sheets-Sheet 4

INVENTOR.
FRANK I. ZONIS
BY Arthur L. Bowers
AGENT
Max L. Farmer
ATTORNEY

United States Patent Office 3,369,184

Patented Feb. 13, 1968

3,369,184

ORTHOGONAL SEQUENCE GENERATOR

Frank I. Zonis, Trenton, N.J., assignor, by direct and mesne assignments, to the United States of America as represented by the Secretary of the Navy Filed June 19, 1964, Ser. No. 376,601
7 Claims. (Cl. 328—62)

ABSTRACT OF THE DISCLOSURE

An orthogonal sequence generator capable of generating signals which are mutually orthogonal over an interval T. Each of the signals has constant magnitude, but the polarity of each signal varies with the period T. The basic elements are a set of square wave generators with periods $T_i$ where $T/T_i=2^{X_i}$ and the $X_i$ are different non-negative integers for each $i$. The square waves need not be in phase nor have the same magnitude. These square waves are mutually orthogonal over any interval T. Another orthogonal sequence is the constant polarity signal. The signals described above form an orthogonal set. Other orthogonal sets may be formed by multiplying each of the basic signals by any constant magnitude signal.

Figure 1:
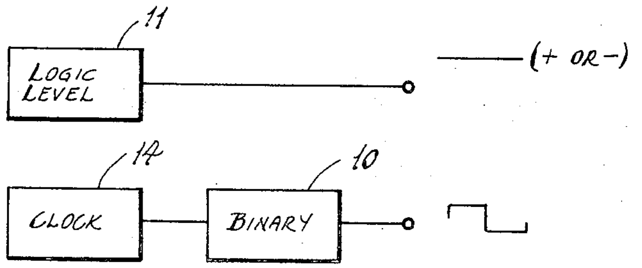

This invention relates to an orthogonal sequence generator for communications.

In many digital communications applications the ideal signaling alphabet is a set of orthogonal signals.

The term orthogonal as used herein derives from vector analysis, where two vectors A and B are said to be orthogonal if $$AB=A_xB_x+A_yB_y+A_zB_z=0$$

In the same manner vectors in $n$ dimensions have components $A_i$, $B_i$ ($i=1, 2, \ldots n$) are said to be orthogonal when $$\sum_{i=1}^{i=n} A_iB_i=0$$

In a vector space of an infinite number of dimensions in which the components $A_i$ and $B_i$ are continuously distributed, $i$ is a continuous variable $x$ and the scalar product of the above relationship is $$\int_c^d A(x)B(x)dx=0$$

The functions of A and B in the above relationships are said to be orthogonal over the intervals $(c, d)$. This is taken from Applied Mathematics for Engineers and Physicists by Louis A. Pipes, second edition, McGraw-Hill Book Co. 1958.

Digital communication systems, such as telegraphy, are those that can transmit only a discrete set of symbols. Digital systems have become increasingly important in recent years. There is a two-fold reason for this. First, led by C. E. Shannon in his papers, "A Mathematical Theory of Communications," published in the Bell Syst. Tech. Jour., 27, Part I, pp. 379–423, July 1948, Part II, pp. 623–656, October 1948, and "Communication in the Presence of Noise," published in the Proc. IRE, pp. 10–21, January 1949, the science of information theory has been deevloped. Perhaps the most startling result of this theory is that under certain conditions it is possible to transmit digital information through a noisy channel with arbitrarily small error probability. The second reason for the interest in digital transmission systems is the rapidly increasing number of applications for these systems, for example, computer to computer data transmission and military command and control systems.

A digital system operates in the following fashion. An information source selects a symbol to be sent. The waveform corresponding to this symbol is then transmitted and corrupted by noise in the channel. At the receiver the corrupted waveform is processed and then a decision is made as to what symbol has been sent. In order to minimize the chance of the receiver making an error, waveforms must be selected to represent the various symbols that are easily distinguishable from each other, and the signal processing section of the receiver must be designed to make optimum use of this distinguishability.

The key to both of these considerations lies in the cross-correlation of the signals. This is a measure, commonly used in statistics, of the degree of likeness between different waveforms or other events. Suppose that the signals representing the M possible symbols in a digital communication system are $S_1(t)$, $S_2(t)$, . . . $S_M(t)$. Furthermore, suppose that all the signals are of duration T and have equal energy E (across a one-ohm load). That is $$E=\int_0^T S_i^2(t)dt \text{ for } i=1, 2, \ldots, M \quad (1)$$

The cross-correlation coefficient $\rho_{ij}$ of the signals $S_i(t)$ and $S_j(t)$ is then defined mathematically as $$\rho_{ij}=\frac{\int_0^T S_i(t)S_j(t)dt}{E} \text{ for all } i \text{ and } j \quad (2)$$

For example, see "Handbook of Probability and Statistics" by R. S. Burrington and D. C. May, Jr., Handbook Publishers, Inc., 1958, pages 130–132. The cross-correlation of two signals is thus obtained by integrating the product of the signals over the signal duration and then normalizing the product by dividing by the common energy E.

A digital receiver can be constructed that computes, over each symbol interval, the cross-correlation of the received waveform and each of the possible signals that might have been transmitted. The receiver then selects the symbol having the algebraically largest cross-correlation with the received waveform as the one most likely transmitted. Such a receiver yields the minimum error probability in a system transmitting M equiprobable symbols by means of any specified set of M equal energy signals which are corrupted by additive white gaussian noise. This has been shown by G. L. Turin in "An Introduction to Match Filters," IRE Trans. on Information Theory, IT–6, pp. 311–329, June 1960, and by V. A. Kotel'nikov in "The Theory of Optimum Noise Immunity," McGraw-Hill, New York 1959, as well as others in the communications field.

Kotel'nikov further shows that the optimum receiver for signals of unequal energy or probability is similar to the one described above except that the correlations are weighted before a decision is made. Hence, a correlation receiver is the optimum receiver for a large class of digital communication systems.

Next consider the problem of signal selection. It is apparent that the cross-correlation of any pair of possible signals should be made as small as possible if the minimum error probability is to be obtained. The optimum selection is signals that all have minimum (and equal) negative correlation with each other. The minimum cross-correlation is $$\rho_{ij(\min)}=-\frac{1}{M-1} \text{ for } i\neq j \text{ and } M \text{ symbols,} \quad (3)$$

as has been shown by A. H. Nuttall in "Error Probabilities for Equicorrelated M-ary Signals Under Phase-Coherent and Phase-Incoherent Reception," IRE Trans. on Information Theory, IT–8, pp. 305–314, July 1962.

As the number of possible symbols M that may be transmitted increases, it becomes more difficult to find signals to represent them that satisfy Equation 3 exactly. Therefore, in recent years a number of signal sets that only approximately satisfy Equation 3 have been proposed for non-binary systems. Perhaps the most important of these are sets of orthogonal signals. These are sets of signals that have zero cross-correlation coefficients. Note in Equation 3 that $\rho_{ij}$ approaches zero as M becomes large. Thus, orthogonal signaling asymptotically approaches optimum. Kotel'nikov in the reference cited above has shown than orthogonal system requires $$\frac{M}{M-1}$$

times more energy than the optimum system to provide equivalent performance. Even for relatively small M this factor becomes insignificant.

Orthogonal signaling has another important application. The discussion above assumed that phase-coherent reception of the transmitted signal was possible. That is, it was assumed that the receiver knew or could track the phase of the incoming signal. Thus, the receiver could generate replicas of the possible transmitted signals that were both time and phase synchronous with the incoming signal. However, in many practical systems it is extremely difficult to maintain phase synchronism. If this synchronism is not maintained the optimum receiver is similar to the one described above, except the envelope detectors must be placed between the correlator outputs and the decision device. Note that for this phase-coherent system the minimum output from the correlator-envelope detectors is zero. It follows that the optimum set of signals for this type of system is an orthogonal set.

A reflection of the growing interest in orthogonal systems is the number of different orthogonal systems that have been proposed in the recent literature. These systems have differed primarily in the type of orthogonal signals used. Some of the types of signals are sinusoids with widely spaced frequencies suggested by Turin in the reference cited above; sinusoids spaced $1/T$ apart (where T is the keying interval) suggested by Turin, by A. J. Viterbi in "On Coded Phase-Coherent Communications," IRE Trans. on Space Electronics and Telemetry, SET–7, pp. 3–14, March 1961, and by H. F. Harmuth in "Radio Communication With Orthogonal Time Functions," Trans. AIEE, (Comm. and Electronics), No. 49, pp. 221–228, July 1960, and in "Orthogonal Codes," Proc. IEE (British), 107C, pp. 242–248, September 1960; signals with non-overlapping epochs suggested by Harmuth; square waves with selected frequencies suggested by R. C. Titsworth in "Coherent Detection of Quasi-Orthogonal Square Wave Pulse Functions," IRE Trans. on Information Theory, IT–6, pp. 410–411, June 1960; and selected sequences of positive and negative pulses as suggested by Viterbi and Harmuth. The invention described herein generates orthogonal signals of the latter type.

An object of this invention is to obtain a set of orthogonal signals in a simple, advantageous, generally superior manner.

A further object is to provide a set of orthogonal signals for high reliability communications.

A further object is to provide orthogonal signals characterized by a continuously changing code.

A further object is to provide a method of obtaining a set of orthogonal signals wherein there is a wide range of choice of the number of orthogonal signals in the set.

A further object is to provide a simple means of selecting different sets of orthorgonal sequences.

Other objects and advantages will appear from the following description and examples of the invention, and the novel features will be particularly pointed out in the appended claims.

Figure 3:
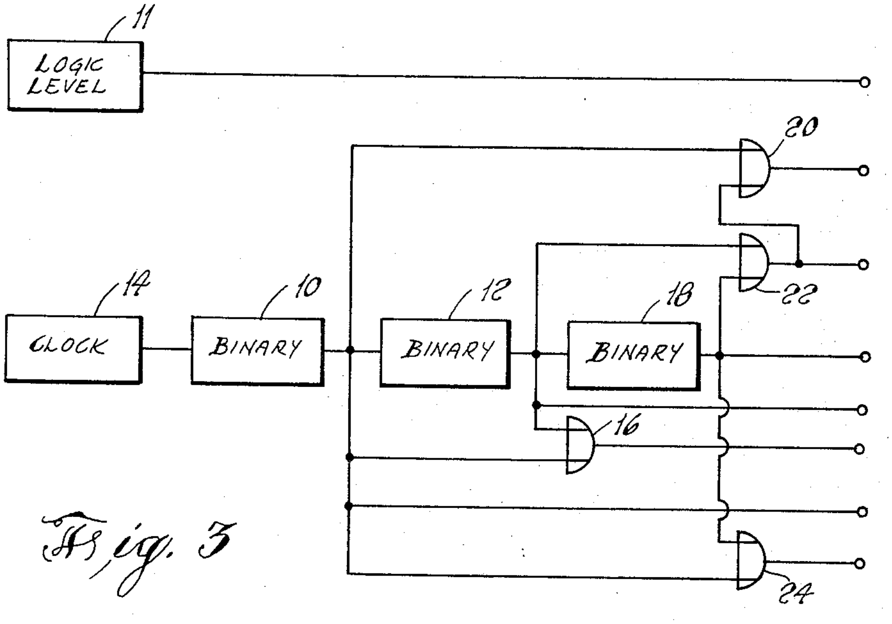
Figure 4:
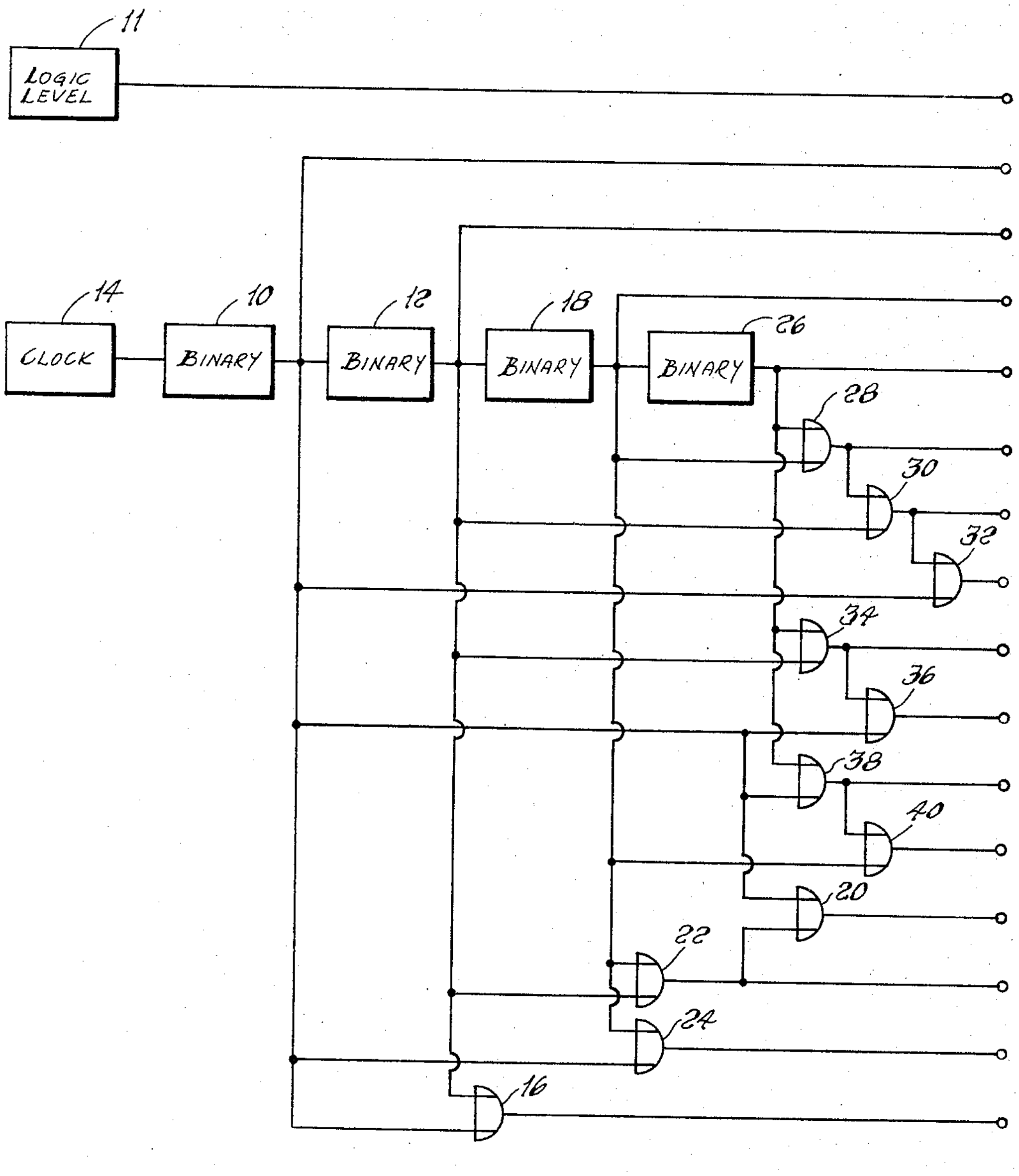
Figure 5:
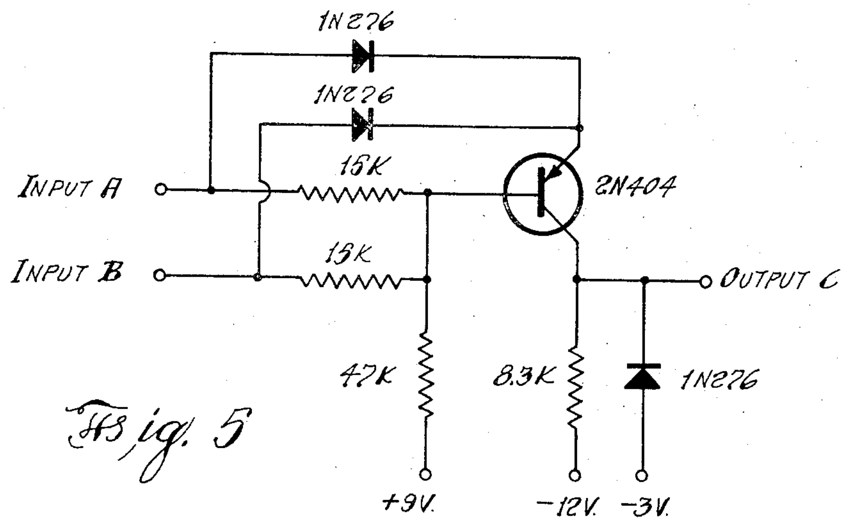
Figure 6:
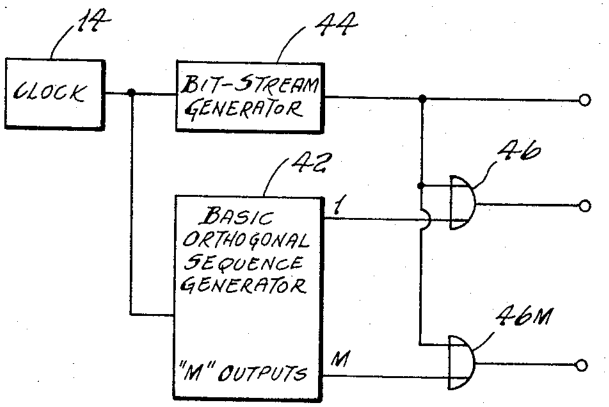
Figure 7:
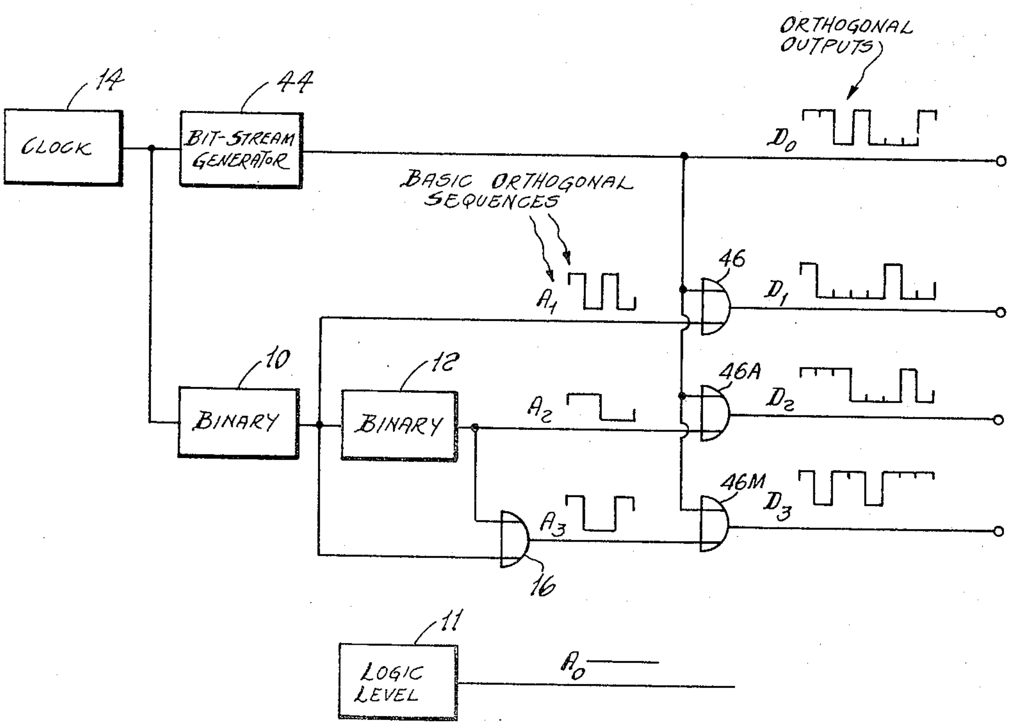
Figure 8:
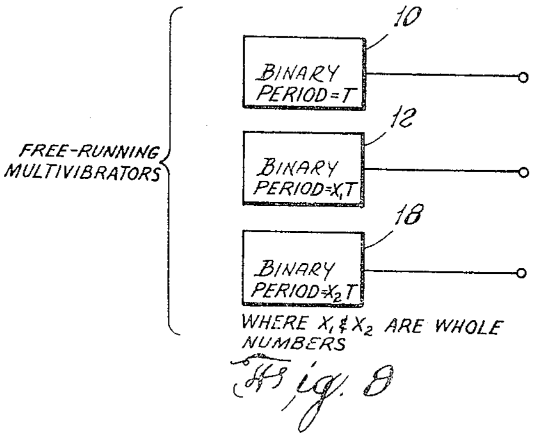

FIGS. 1 through 4 illustrate embodiments of this invention for providing 2, 4, 8, and 16 orthogonal outputs, respectively, FIG. 5 is a circuit diagram of one example of a multiplier device that may be used in the embodiments shown in FIGS. 2 through 4, FIG. 6 is a circuit diagram of an embodiment of the invention including a bit stream generator, FIG. 7 illustrates an example of the combination in FIG. 6 having four outputs and showing typical output waveforms, and FIG. 8 illustrates an embodiment of the invention employing free running binary devices.

The invention provides a means of generating square wave signals that are orthogonal over some specified interval T. Each orthogonal signal is made up of the same number of equal-duration elemental positive and negative pulses of equal voltage magnitude relative to a selected reference potential. These equal-duration elemental pulses shall be referred to as chips. For convenience, assume each orthogonal signal is made up of M chips end-to-end, that is, having unity duty cycle; then, the duration of each chip in signal interval T is T/M. Also, for convenience, assume the edges of the corresponding chips in respective signals are coincident in time. The magnitude voltage of chips in different ones of the orthogonal signals need not be equal. Orthogonal signals of the type described here can therefore be completely specified by listing the algebraic sign of each of the M chips making up the signal. Let a typical signal $S_i(t)$ be denoted by $$S_i(t)=(b_{i1}, b_{i2}, \ldots, b_{ik}, \ldots, b_{in}) \quad (4)$$

where the $b_{ik}$ equals $+1$ or $-1$ depending on the sign of the $k$th chip in the $i$th signal. Recall that the cross-correlation coefficient of two signals, as defined by Equation 2, is proportional to the integral of the product of the signals over the signal duration. However, if the signals are made up of equal duration time-coincident chips, the integral of Equation 2 can be replaced by the sum of the chip-by-chip products of the signals. $\rho_{ij}$ is therefore proportional to the quantity $$r_{ij}=\sum_{k=1}^{M} b_{ik}b_{jk} \quad (5)$$

Next, note that if the $i$th and $j$th signals are to be orthogonal $r_{ij}$ must equal zero. However, the product $b_{ik}b_{jk}$ can (by definition of the $b$'s) assume only the values plus or minus one ($\pm1$). Thus, for orthogonality M must be even and there must be an equal number of $+1$'s and $-1$'s in the sum. It follows that two signals of the type considered here are orthogonal if half the chips of one signal have the same sign as the corresponding chips of the other signal and the other half do not.

For the present consider only signals made up of $M=2^x$ chips, where $x$ is any non-negative whole number, that is, signals made up of 2, 4, 8, 16, 32, etc., chips respectively. Moreover, for convenience, assume that one of the signals, say $s_0(t)$ has all positive chips which corresponds to a constant direct current voltage. It follows from above that a signal $s_1(t)$ made up of M/2 positive chips followed (or preceded) by M/2 negative chips will be orthogonal to $s_0(t)$. Next, if $M>4$, the signal $s_2(t)$ made up in sequence of M/4 positive chips, M/4 negative chips, M/4 positive chips, and M/4 negative chips will be orthogonal to both $s_0(t)$ and $s_1(t)$. (This can easily be verified from the waveforms shown in FIG. 2). Another signal $s_3(t)$ orthogonal to the three preceding signals is one simliar to $s_2(t)$ but with the last two blocks of M/4 chips changed in sign. It should be noted that $s_3(t)$ can be formed as the chip-by-chip product of $s_1(t)$ and $s_2(t)$. Note that $s_0(t)$ may be considered the first half of a square wave of period 2M chips long, that $s_1(t)$ is a square wave of period M chips long, and that $s_2(t)$ is a square wave of period M/2. It may be concluded that square waves whose periods are related to each other by a factor equal to a non-negative integral power of 2 are orthogonal over any interval equal to an integral multiple integral multiple of the period of the longest square wave. Furthermore, the symmetry of square waves permits one to introduce arbitrary shifts of the time axis of each square wave without destroying the orthogonality of the signals, as shown below. Moreover, it was seen that the chip-by-chip product of the two square waves $s_1(t)$ and $s_2(t)$ yielded a new signal $s_3(t)$ that was orthogonal to both of these square waves and also to $s_0(t)$; $s_3(t)$ was a square wave whose period was equal to twice the period of the generating square wave $s_2(t)$; see FIG. 2. These observations may be generalized to show that if $M=2^x$ where $x$ is a non-negative whole number, a set of M mutually orthogonal sequence can be generated by generating $x$ square wave sequences of periods M chips long, M/2 chips long, . . . , 2 chips long; the all positive sequence; and the $M-x-1$ distinct products of the square wave mutually orthogonal sequences. The products are formed by first taking all different combinations of the mutually orthogonal square wave sequences two at a time, then 3 at a time, etc., and finally taking the product of all $x$ square wave sequences. These observations are proven mathematically below.

It should be noted that in the case where the edges of the square waves are not time coincident, the lengths of the positive and negative pulses of the product sequences will not bear an integral relation to T/M. However, the signals will still be orthogonal. Only in the special case of time coincidence of the square waves will all M orthogonal signals consist of M time-coincident chips, each of duration T/M.

In this special case of time coincident chips, which is a case with much practical interests, the M orthogonal sequences generated in the above manner form a complete set. That is, there exists in this particular complete set M and only M chip-coincident mutually orthogonal binary sequences M chips long. There does exist, however, other chip-coincident sets of M orthogonal signals M chips long. First, note that any signal in an orthogonal set can be replaced by its negative to form a new set without altering the mutual orthogonality of the set. In order to disregard these trivially different sets, consider the number B of different biorthogonal sets (made up of M orthogonal signals and their negatives) that can be formed from sequences M chips long. The total number of possible sequences is $2^M$. Therefore $$B=\frac{2^M}{2M}=\frac{2^M}{2(2^X)}=2^{M-x-1} \tag{6}$$

The values of B for some small values of M and $x$ are tabulated below.

| M | x | B |
|---|---|---|
| 2 | 1 | 1 |
| 4 | 2 | 2 |
| 8 | 3 | 16 |
| 16 | 4 | 2,048 |
| 32 | 5 | 67,108,864 |
| 64 | 6 | $1.44\ (10)^{17}$ |

In examining this tabulation note that, aside from $M=2$, more than one biorthogonal set exists and that the number of possible sets increases extremely rapidly with increasing M or $x$.

This last observation is of great importance when designing communications systems (for example military systems) that are intended to operate in an environment of intelligent jamming. If such a system were to transmit a fixed set of orthogonal signals, the jammer could quickly determine the form of a typical signal and from this, using the orthogonality relations, the entire set of signals. The jammer could then randomly transmit these signals and, thus, cause a large number of errors at the receiver. In contrast, if the orthogonal set of signals used for transmission is selected in a random like manner from a large number of possibilities each time a symbol is to be transmitted, the jammer is denied a prior knowledge of the possible transmitted signals. Hence, his jamming will be much less effective.

Now consider how these continuously changing orthogonal sequences can be generated. It was shown above how one particular set of $M=2^x$ time-coincident orthogonal sequences could be formed. Suppose each member of this set is multiplied by a reference signal consisting of M chips to form a new set of signals. The cross-correlation coefficient of any two signals in the new set is proportional to the sum of their chip-by-chip products. However, in each product the sign of the reference chip appears twice (once for each signal) and, thus, does not effect the sign of the product. Therefore, since the original signals were orthogonal, the new signals also are orthogonal. It follows that if the reference signal is a continuously changing bit-stream, the resultant set of signals will have the desired continuously changing code properties. Of course, neither the binaries in the basic sequence generator nor the bit stream generator needs to be chip coincident, as is shown below. In fact, the bit stream generator may produce any arbitrary constant magnitude signal that might be desirable in a particular application. Because this invention can generate continuously changing orthogonal sequencies, it should find many applications in military antijam communication systems.

Before concluding this discussion consider one other configuration, similar to that described above that might be useful in some applications. Suppose in the above configuration that the reference sequence, rather than being randomlike, is periodic with period M. The resultant signals will then be a fixed set of orthogonal signals of period M possessing, perhaps, additional desirable properties, because of an appropriate choice of the reference sequence. The utility of this configuration is that the orthogonal set can readily be changed by making simple changes in the reference sequence generator without changing the entire system.

If orthogonal sequences longer than M are desired from any of the above configurations these may be obtained by treating K blocks of M output chips as the orthogonal signals. If K is an odd integer, the number of orthogonal signals available using the above method remains M. However, if K is even, then the above procedure can be made to yield even more orthogonal sequences.

The output set of orthogonal signals from the orthogonal sequence generator is a set of orthogonal baseband signals. These may be used to 180° phase shift key a carrier, thus providing orthogonal RF signals. For example, if a carrier is delivered to parallel channels, one channel for each orthogonal baseband signal of the set, each orthogonal baseband signal may be used to 180 degree phase-shift the carrier in the respective channel. The channel outputs are then a set of orthogonal RF signals.

The following is a methematical proof that the signals described above are orthogonal.

*Theorem 1.*—Let $A_i(t)$ for $i=1, 2, \ldots X$ be square waves, and let each $A_i(t)$ have exactly $2^{X-i}$ periods in any interval (0, T). Then $A_i(t)$ is orthogonal to $A_j(t)$ over any interval $(t_0, t_0+T)$ for any $i\neq j$.

Proof: Consider the integral $$r_{ij}=\int_{t_0}^{t_0+T} A_i(t)A_j(t)dt \tag{A}$$

Let $j>i$ and let the first transition of $A_j(t)$ in the interval $(t_0, t_0+T)$ occur at $t_j$. Define $v=2^{X-j+1}$ and divide the interval $(t_0, t_0+T)$ into $v+1$ subintervals at the points $t = t_j + (kT/v)$, $k = 0, 1, \ldots, v-1$. $A_j(t)$ is constant within each subinterval. Thus $$r_{ij} = \int_{t_0}^{t_j} A_i(t)A_j(t)\,dt + \sum_{k=0}^{v-2} A_j\left(\frac{(k+\frac{1}{2})T}{v}\right)\int_{t_i+\frac{kT}{v}}^{t_j+\frac{(k+1)T}{v}} A_i(t)\,dt + \int_{t_j+\frac{v-1}{v}T}^{t_0+T} A_i(t)A_j(t)\,dt \tag{B}$$

By definition of the $A_i(t)$'s, $A_i(t) = A_i(T+t)$. Thus the first and last terms on the right-hand side of Equation B may be combined and included in the sum to yield the expression $$r_{ij} = \sum_{k=0}^{v-1} A_j\left(\frac{(k+\frac{1}{2})T}{v}\right)\int_{t_j+\frac{kT}{v}}^{t_j+\frac{(k+1)T}{v}} A_i(t)\,dt \tag{C}$$

However, each integral in Equation C extends over exactly $2^{X-i}/2^{X-j+1} = 2^{i-j-1}$ full periods of the square wave $A_i(t)$ and is therefore equal to zero. It follows that $r_{ij} = 0$ and, hence, that the signals are orthogonal over any interval $(t_0, t_0+T)$. Q.E.D.

Next, denote the product of any two of the square waves considered above at $B_{jk}(t)$. That is $$B_{jk}(t) = A_j(t)A_k(t)\ i \neq j \tag{D}$$

Then:

*Theorem 2.*—$B_{jk}(t)$ is orthogonal to each of the $A_i(t)$ over an interval $(t_0, t_0+T)$.

Proof: First suppose that $i=j$ (or $k$). Then the integral $$r_{ijk} = \int_{t_0}^{t_0+T} A_j(t)B_{jk}(t)\,dt = |A_j(t)|^2 \int_{t_0}^{t_0+T} A_k(t)\,dt = 0 \tag{E}$$

and hence these signals are orthogonal.

Next suppose $i<j<k$ (that is, the three indexes are different). Then, following a procedure similar to that used for the proof of Theorem 1, let $t_k$ be the first transition of $A_k$ in the interval $(t_0, t_0+T)$ and portion the interval into $y = 2^{X-k+1}$ subinterval at $t_0+nT/y$, $n = 0, 1, \ldots, y-1$. Then $$r_{ijk} = \int_{t_0}^{t_0+T} A_i(t)B_{jk}(t)\,dt = \int_{t_0}^{t_0+T} A_i(t)A_j(t)\,dt = \sum_{n-0}^{y-1} A_k\frac{(n+\frac{1}{2})T}{y}\int_{t_k+\frac{nT}{y}}^{\frac{t_k(n+1)T}{y}} A_i(t)A_j(t)\,dt \tag{F}$$

Now consider the interval $$(t_k + nT/y,\ t_k + (n+1)/y)$$

There are exactly $$2^{X-i}/2^{X-k+1} = 2^{k-i-1}$$

full periods of $A_i(t)$ in this interval and similarly $2^{k-j-1}$ full periods of $A_j(t)$ in this interval. By Theorem 1, each of the integrals appearing in the last expression of Equation F equals zero and thus $$r_{ijk} = 0 \tag{G}$$

It follows from E and G that $A_i(t)$ is orthogonal to $B_{jk}(t)$ over $(t_0, t_0++)$ for all $i$ and all $j \neq k$. Q.E.D. Corrollary: If $j = kB_{jk}(t)$ is a constant and is orthogonal to all $A_i(t)$ and all $B_{jk}(t)$ with $j \neq k$ over $(t_0, t_0+T)$. This follows from Equation E.

Using techniques analogous to those used in proving Theorems 1 and 2 the following general theorem may be proved:

*Theorem 3.*—The set of signals consisting of (1) a constant signal, (2) the X square waves $A_i(t)$, and (3) all distinct products of the $A_i(t)$'s taken 2, 3, . . . , X at a time form an orthogonal set of signals on any interval $(t_0, t_0+T)$. The size of the set specified in Theorem 3 may be computed as follows. The number of distinct combinations of X things taken $k$ at a time is given by the binominal coefficient $$\binom{X}{n} = \frac{X!}{k!(X-n)!}$$

Thus the size of the set is $$\sum_{k=0}^{X}\binom{X}{k} = 2^X \tag{H}$$

A discussion of binomial coefficients and a proof of Equation H may be found in "An Introduction to Probability Theory and Its Applications," volume 1, second edition, by William Feller, John Wiley and Sons, Inc., 1957. The set specified in Theorem 3 is the basic orthogonal set referred to above.

Note that nowhere in the above derivation it is required that the edges of the square waves be time coincident, nor it is required that the waves have equal amplitude. In many applications of this invention these properties may be desirable. However, they are not necessary to assure the orthogonality of the signals.

Next suppose that each signal in the set specified in Theorem 3 is multiplied by a pulse train $P(t)$ made up of equal magnitude positive and negative pulses of arbitrary duration. Let $C_i(t)$ be a member of the set specified in Theorem 3 and $$D_i(t) = C_i(t)\,P(t)$$

Then the set of signals $D_i(t)$ will be orthogonal over an interval $(t_0, t_0+T)$. Proof: Let $$P_{ij} = \int_{t_0}^{t_0+T} D_i(t)D_j(t)\,dt \text{ with } i \neq j = \int_{t_0}^{t_0+T} P^2(t)C_i(t)C_j(t)C_j(t)\,dt$$

but $P^2(t)$ is a constant. Thus from Theorem 3

$$P_{ij} = 0$$

and the signals are orthogonal.

The invention described above can be implemented with digital logic circuitry. For example, the X square waves required for the basic orthogonal set can be generated as the outputs of X binaries (triggered flip-flops) connected as a binary divider chain. For example, see J. Milman and H. Taub, "Pulse and Digital Circuits," McGraw-Hill, New York, 1956. This chain would be triggered at a rate of M pulses per signal, and thus, the output of the first flip-flop would be square wave of period 2 and the output of the last flip-flop would be a square wave of period M. The additional signals in the set will consist of the +1 (or −1) logic level and all possible distinct products of the square waves. These products may be obtained either in a straight forward manner using electronic multipliers or logically using exclusive OR gates. If an orthogonal set of signals other than this basic set is desired, a member of this new set must be generated in a bit-stream generator. (Possible forms of this bit-stream generator are discussed below). The output of the bit-stream generator is then multiplied by each of the basic set of orthogonal signals to yield the desired orthogonal set. Typical examples of the invention are discussed below.

In FIG. 1 there is shown a minimum chain of one binary divider 10 driven by a clock device 14 that generates a continuous train of pulses of constant pulse repetition frequency, designated a clock on the drawing. The binary generates alternate positive and negative pulses of equal length and equal absolute magnitude. Also included in FIG. 1 is a logic level device 11, for example, a power supply, that has as its output a constant magnitude signal equal to the magnitude of the binary pulses. The outputs of the binary 10 and logic level device are orthogonal over any whole number of the periods of the binary output signal.

Figure 2:
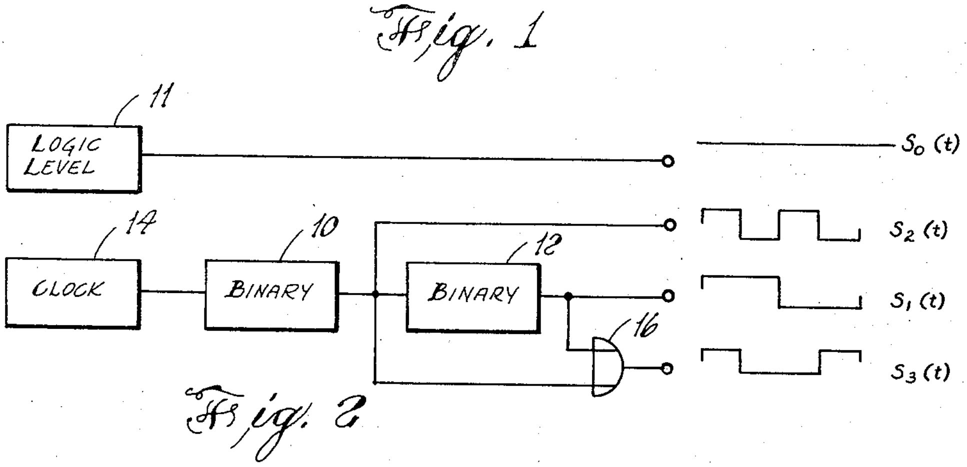

The combination in FIG. 2 includes, in addition to that shown in FIG. 1, a second binary 12 and a multiplier device 16, also termed an exclusive OR gate, connected to the binary chain. The length of pulses from binary 12 is double the length of pulses from binary 10. Binary 12 is driven by binary 10. The edges of each pulse from binary 12 are essentially coincident with the edges of a pulse from binary 10. A flip-flop may be used for said binary. The two binary outputs are orthogonal over any whole number of periods of the output from binary 12. The multiplier device 16 has two inputs and one output and operates to provide an output of one polarity when the inputs are of the same polarity and provides an output of the reverse polarity when the two inputs are of different polarity, and in each case of the same magnitude as the binary pulses. The output of multiplier device 16 shown in FIG. 2 is obtained when the two binary outputs, which are the inputs to the multiplier device, are as shown in FIG. 2. By way of example, the multiplier device may be a circuit as in FIG. 5, wherein:

| Logic Levels: | Truth Table | | |
|---|---|---|---|
| | A | B | C |
| −1=+3 volts<br>+1=−3 volts | +1<br>+1<br>−1<br>−1 | +1<br>−1<br>+1<br>−1 | +1<br>−1<br>−1<br>+1 |

This circuit adapted from "Exclusive OR Use One Transistor" by G. Fox, Electronic Equipment Engineering, August 1961.

In FIGS. 3 and 4, there are shown longer chains of binary devices. The combination in FIG. 3 can provide up to eight orthogonal outputs; if less than eight orthogonal outputs are required, any of the outputs equal to the number required may be selected. The combination in FIG. 4 can provide up to sixteen orthogonal outputs; if less than sixteen orthogonal outputs are required, any of the outputs equal to the number required may be selected. A chain of five binary dividers can provide up to thirty-two orthogonal outputs, etc. The edges of each pulse from the second or any successive binary device in the chain are coincident with the pulses from each preceding binary device.

In FIG. 3, the chain includes three binary devices 10, 12, and 18. A multiplier device 16 is connected as in FIG. 2. In addition, this circuit includes three additional similar multiplier devices 20, 22, and 24, and the logic level device 11 whereby the circuit provides a total of eight outputs.

In FIG. 4, the chain includes four binary devices, 10, 12, 18, and 26. Multiplier devices 16, 20, 22, and 24 are connected as in FIG. 3. In addition, this circuit includes multiplier devices 28, 30, 32, 34, 36, 38, and 40, whereby the circuit provides fifteen orthogonal outputs. The logic level device 11 provides a sixteenth orthogonal output.

The circuit shown in FIG. 6 includes a basic orthogonal sequence generator 42 having "M" outputs where M can be any whole number including one. The basic orthogonal sequence generator may be any of the circuits minus the clock and logic level device shown in FIGS. 1 through 4, or an extension of these circuits for larger M. FIG. 6 further includes a bit stream generator 44 for generating a stream of positive and negative pulses, having a length equal to X times the period of the clock pulses where X is any whole number including one and of the same magnitude as the binary pulses. X may vary from pulse to pulse. Each of the leading and trailing ends of the pulses from the bit stream generator are coincident with a timing pulse from clock 14. A multiplier device 46 responds to the output of the bit-stream generator 44 and an output of the orthogonalizing means 42. The circuit includes a multiplier device for each of the outputs of the basic orthogonal sequence generator. The outputs of the bit stream generator and each of the "M" multiplier devices connected to the bit stream generator are orthogonal. Bit stream generators suitable for this purpose are known in the art. A treatment of electronic devices of this type is included in "A Radar System Based on Statistical Estimation and Resolution Considerations" by B. Elpas, Technical Report No. 361–1, August 1, 1955, Reprinted December 15, 1958, Stanford Electronic Laboratories, Stanford University, Stanford, California, pages 135–148.

Another reference for electronic sequence generators is "Linear Recurring Sequences" by N. Zierler in Journal of the Society for Industrial and Applied Mathematics, March 1959, pages 31–48.

The bit stream generator 44 may also be a mechanical device such as a paper or magnetic tape reader; any arbitrary bit stream, i.e. successive poistive and negative pulses of arbitrary unrelated lengths, suitable for a particular application could then be recorded by conventional means on the tape and then made available to the sequence generator.

A typical orthogonal sequence generator employing a bit-stream generator is shown in FIG. 7. In this example $M=4$. The portion of this sequence generator used to provide the basic orthogonal sequences consists of the common clock 14, the two binaries 10 and 12, and the logic level device 11. The basic orthogonal waveforms are shown as $A_0$ through $A_3$. Note that the portion of FIG. 7 cited above is the same as the circuit of FIG. 2. The bit stream generator 44 and the three multipliers 46, 46A, 46M complete the circuit. As can be seen, the logic level device 11 is not required when the bit stream generator is used. The waveform $D_0$ through $D_4$ are typical outputs of the orthogonal sequency generator over two periods. Note that the chips of each waveform have the same polarity as the chips of the other three waveforms over half of each orthogonal period.

Within the broader aspects of this invention, as shown in FIG. 8, the binary devices may be distinct and may be free running multivibrators, provided that the period of each binary remains constant, and provided that the ratios of the periods are equal to an integral power of 2. In other words, the phase relationships of the outputs of the binary devices are not limited to that defined in the description of the preceding embodiments. Also, the magnitudes of the pulses from binary devices may be unequal and may be different from the magnitudes of the outputs of the logic level, bit-stream generator, and the multipliers which in turn may be different from each other. A limitation imposed on the above is the added expense and sophistication in the signal processing circuitry. Where signal magnitudes are equal and phase relationships are as previously described, implementation of the invention is less expensive and simpler and where the invention is applied to computers, in many instances, these conditions will be essential.

Since orthogonal signals are of optimum reliability under many conditions, this invention is useful in many applications requiring high reliability communications. A feature that makes this technique attractive for military command communications is that a continuously changing code may be employed without sacrificing the orthogonality of the signals. Another feature that makes the technique attractive is that any of the possible sets of M orthogonal sequences M chips long may be periodically generated by periodically generating a member of the set in the bit stream generator. This set can then be exchanged for another at any time simply by changing the bit stream generator.

It will be understood that various changes in the details, materials and arrangements of parts (and steps) which have been herein described and illustrated in order to explain the nature of the invention, may be made by those skilled in the art within the principle and scope of the invention as expessed in the appended claims.

I claim:

1. An orthogonal sequence generator comprising:
(a) a plurality of binary devices each having an output terminal and each binary device being operative to provide at its output terminal relative to a reference potential a train of end-to-end alternately positive and negative pulses of equal pulse length,
(b) the periods of all the binary devices being unequal,
(c) the period of each binary device other than the one with the shortest period having a period $2^x$ times the shortest period, where $x$ is a non-negative whole number,
(d) a bit stream generator for generating end-to-end alternately positive and negative pulses of arbitrary lengths,
(e) one multiplier means having two inputs and one output for each binary device, one input of each multiplier means coupled to the output of the bit-stream generator and the other input coupled to the respective binary device and providing an output pulse of one polarity when the polarities at the inputs are the same and providing an output of the other polarity when the polarities at the inputs are opposite,
(f) whereby the output pulses of the multiplier means and of the bit-stream generator are orthogonal over any interval equal to an integral multiple of the period of that binary device having the longest period.

2. An orthogonal sequence generator comprising:
(a) means for providing a train of timing pulses,
(b) a first binary device having an input coupled to said timing pulse means and having an output,
(c) said first binary device being operative in response to timing pulses to provide, relative to a reference potential, a train of end-to-end alternately positive and negative pulses of equal length,
(d) a chain of additional binary devices coupled to the output of said first binary device,
(e) each binary device in the chain being operative in response to pulses from the preceding binary device to provide, relative to the selected reference potential, a train of end-to-end alternately positive and negative pulses of equal length, the lengths of pulses provided by the binary devices in the chain being $2^x$ times the length of pulses provided by the first binary device, where $x$ is the position of the binary device in the chain relative to the first binary device,
(f) a bit-stream generator, having an output for generating alternate positive and negative pulses of arbitrary lengths,
(g) one multiplier means having two inputs and one output for each binary device, one input of each multiplier means coupled to the output of the bit-stream generator and the other input coupled to the respective binary device and providing relative to said reference potential an output pulse of one polarity when the polarities at the inputs are the same and providing an output of the other polarity when the polarities at the inputs are opposite, whereby
(h) the pulse outputs of the multiplier means and of the bit-stream generator are orthogonal over any interval equal to an integral multiple of twice the pulse length of that binary device in the chain most remote from the first binary device.

3. An orthogonal sequence generator as defined in claim 2, further comprising:
(j) another multiplier means having two inputs and one output, the two inputs of the other multiplier means coupled to the outputs of two of the binary devices and providing relative to said reference potential an output pulse of said one polarity when the polarities at its inputs are the same and providing an output pulse of said other polarity when the polarities at its inputs are opposite,
(k) still another multiplier means having two inputs coupled to the outputs of said another multiplier means and said bit-stream generator respectively, and having an output for providing an output pulse of said one polarity when the polarities at its inputs are the same and providing an output pulse of said other polarity when the polarities at its inputs are opposite.

4. An orthogonal sequence generator comprising:
(a) a binary device having an output for delivering successive positive and negative pulses of the same length,
(b) a bit-stream generator having an output for delivering a train of successive positive and negative pulses of arbitrary lengths,
(c) a multiplier means having two inputs coupled to the outputs of the bit-stream generator and said binary device respectively, and having an output and providing a pulse at its output of one polarity when the polarities at both its inputs are of the same polarity and providing an output pulse of the other polarity when the polarities at its inputs are of opposite polarities,
(d) whereby the output pulses of the bit-stream generator and of the multiplier means are orthogonal signals, over any interval equal to an integral number of periods of the binary device,
(e) a second binary device having an output for delivering successive positive and negative pulses of equal lengths, and of $2^x$ times the length of the pulses delivered by the first binary device where $x$ is a whole number, and
(f) a second multiplier means having two inputs coupled to the output of the bit-stream generator and the output of the second binary means, respectively, and having an output providing an output pulse of said one polarity when both its inputs are at the same polarity and providing an output pulse of the other polarity when its inputs are at opposite polaritiies,
(g) whereby over any interval equal to an integral multiple of twice the pulse length provided by the second binary device the output pulses of the bit-stream generator and of the two multiplier means are othogonal signals.

5. An orthogonal sequence generator comprising:
(a) means having an output providing a train of timing pulses,
(b) a bit-stream generator having an input coupled to the output of the timing pulse means and having an output for delivering a train of successive positive and negative pulses relative to a reference potential, the length of each pulse delivered by the bit-stream generator being an integral multiple of the period of the timing pulses,
(c) a binary device having an input coupled to the output of said timing pulse means and having an output delivering relative to the reference potential successive positive and negative pulses in response to the timing pulses, each positive and negative pulse being of a length equal to the period of the timing pulses,
(d) the edges of the pulses delivered at the output of the bit-stream generator being in time-coincidence with edges of pulses delivered at the output of the binary device, (e) a multiplier means having two inputs coupled to the output of the bit-stream generator and the output of said binary device respectively, and having an output providing relative to said reference potential an output pulse of one polarity when pulses delivered to both its inputs are of the same polarity and providing an output pulse of the other polarity when the pulses delivered to both its inputs are of opposite polarities, (f) whereby the output pulses of the bit-stream generator and of the multiplier means are orthogonal signals over any interval equal to an integral multiple of twice the length of pulses delivered by the binary device, (g) a second binary device having an input coupled to the output of the first-mentioned binary device and having an output for delivering relative to the reference potential, in response to pulses at its input, successive positive and negative pulses, each of a length equal to twice the period of the timing pulses, and (h) a second multiplier means having two inputs coupled to the output of the bit-stream generator and the output of the second binary means, respectively, and providing relative to the reference potential an output pulse of said one polarity when pulses at both its inputs are of the same polarity and providing an output pulse of the other polarity when the pulses at its inputs are of opposite polarities, (i) whereby the output of the bit-stream generator and of both multiplier means are orthogonal signals over any interval equal to an integral multiple of twice the length of pulses from the second binary device.

6. An orthogonal sequence generator comprising:

(a) N binary devices each of which has an input and an output, and where N is any whole number greater than 1 for generating at their outputs N respective trains of successive equal length positive and negative pulses wherein the pulse length of the output pulses from all but one of the binary devices is $2^x$ times that of the pulse length of the output pulses from the one binary device where $x$ is any whole number and is different for each binary device, and (b) a network of $2^N-N-1$ multiplier means, each multiplier means having two inputs and one output, each multiplier means providing a pulse of one polarity at its output when the polarities of pulses at its two inputs is the same and providing a pulse of the other polarity at its output when the polarities of pulses at its two inputs are of opposite polarity, said network being connected to the outputs of said binary devices to provide $2^N-N-1$ different products of the N trains of pulses at the outputs of the $2^N-N-1$ multiplier means respectively, (c) whereby the outputs of said binary devices and said multiplier means are orthogonal signals over any interval equal to any integral multiple of twice the pulse length from binary device delivering the longest pulses.

7. An orthogonal sequence generator as defined in claim 6, further comprising:

(d) a code pulse generating means having an output for providing successive positive and negative pulses of arbitrary lengths, (e) $2^N-1$ additional multiplier means each having two inputs and one output, each of the additional multiplier means providing an output pulse of one polarity when the pulse inputs thereto are of the same polarity and providing an output pulse of the other polarity when the pulse inputs thereto are of opposite polarity, (f) one input of each of the additional multiplier means being coupled to the output of the code pulse generating means, the other inputs of the additional multiplier means being coupled to the outputs of the binary devices and the outputs of the $2^N-N-1$ multiplier means, respectively, (g) whereby the outputs of the additional multiplier means are mutually orthogonal signals over any interval equal to an integral multiple of twice the pulse length of the binary device providing the longest pulse.

References Cited

UNITED STATES PATENTS

| | | | |
|---|---|---|---|
| 2,887,676 | 5/1959 | Hamilton | 328—63 X |
| 2,926,242 | 2/1960 | Feyzeau | 328—63 X |
| 3,015,734 | 1/1962 | Jones | 307—88.5 |
| 3,212,010 | 10/1965 | Podlesny | 328—63 X |

ARTHUR GAUSS, *Primary Examiner.*

J. ZAZWORSKY, *Assistant Examiner.*